Sept. 12, 1967     W. J. SHEPARD     3,341,711
PHOTOELECTRICALLY CONTROLLED LUMINAIRE WITH
A PRISM HAVING A MOUNTING PORTION
Filed Oct. 14, 1963

INVENTOR.
WILLIAM J. SHEPARD
BY
Nolte & Nolte
ATTORNEYS

3,341,711
PHOTOELECTRICALLY CONTROLLED LUMINAIRE WITH A PRISM HAVING A MOUNTING PORTION
William J. Shepard, Newark, Ohio, assignor to Holophane Company, Inc., New York, N.Y., a corporation of Delaware
Filed Oct. 14, 1963, Ser. No. 316,005
3 Claims. (Cl. 250—239)

The present invention relates in general to photoelectrically controlled luminaires and in particular to prismatic apparatus for directing light to a photo-control unit.

In the past, considerable difficulty has arisen in mounting and orienting light sensitive switching devices, or photo-control units utilized in street luminaires to properly actuate the light source at a predetermined light input. Generally, it was necessary to move the entire photo-control unit. This was accomplished by revolving the unit to accurately dispose the cell relative to the most ideal light receiving position to turn the light source on or off depending upon the switching arrangement. In any such arrangement, the entire control unit should be mounted to face northerly, yet the control unit must be capable of being readily oriented to prevent undesirable light rays or reflections from striking the light sensitive cell and prematurely activating the switching mechanism.

Such maneuvering necessitated the removal of various screws, plates, screens, pipes and any number of associated elements which could easily be dropped and lost, since the orientation of such devices normally takes place at the top of lighting poles or high buildings, where the units are situated. It can be appreciated that a light control assembly inadvertently dropped from any appreciable height will normally cause such damage as to render the assembly inoperative. It can be understood, in addition, that the difficulty of gaining access to such photo-control assemblies and the subsequent orientation thereof involve considerable effort and expense.

Furthermore, since the photoelectric control cells are normally set high up on a lighting pole or building they are exposed not only to the direct rays of the sun but also to any adverse weather conditions. Such exposure to the direct rays of the sun and the elements of nature tends to shorten the life of the photoelectric control cell.

It is, therefore, an object of the present invention to provide an improved system for installing, orienting and actuating light sensitive switching devices.

It is another object of this invention to provide a photoelectric control system wherein the means for directing the light to the cell is easily accessible and readily adjustable.

It is still another object of the present invention to provide an improved means for controlling the automatic activation and deactivation of light controlled lighting fixtures.

In one embodiment of the present invention there is provided a prismatic device rotatably adjustably positioned within a cavity formed by a mounting unit. The mounting unit is suitably positioned within a cylindrical support in turn supported by a light pole. A photoelectric control switch which is activated by a photo sensitive cell disposed beneath the prismatic device is secured to the mounting unit. The photoelectric control switch and the light sensitive cell secured within the unit are adapted to be completely sealed under operating conditions. Thus, they are not susceptible to harmful direct light rays or the wearing effect of the elements of nature. Adjustment to various lighting conditions is accomplished by rotatable adjustment of the prismatic device.

The various features of novelty which characterize the invention are pointed out with particularity in the claims annexed to and forming a part of this specification.

For a better understanding of the invention, its operating advantages and specific objects obtained by its use, reference should be made to the accompanying drawings and descriptive matter in which there is illustrated and described a preferred embodiment of the invention.

In the drawings.

Referring now more in detail to the drawings, wherein similar reference numerals identify corresponding parts throughout the several views, 10 represents a light controlled luminaire.

Figure 1:
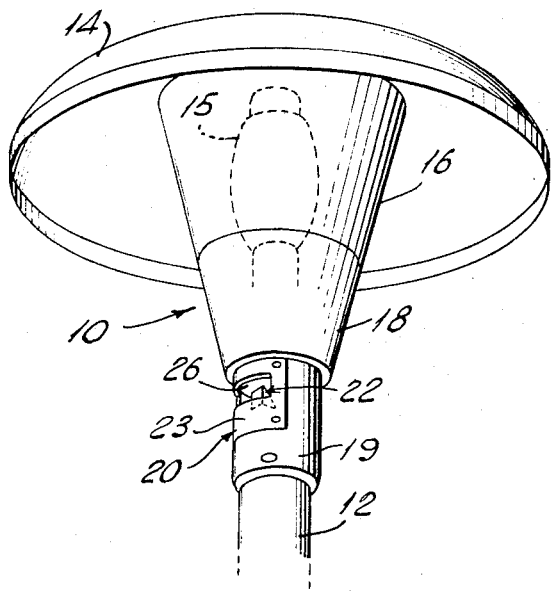
FIG. 1 is a perspective showing of a light fixture and prismatically controlled photoelectric unit positioned therein.

As best seen in FIG. 1 the light controlled luminaire is positioned by suitable means (not shown) upon the top of cylindrical support 19. The luminaire includes a semi-hemispherical reflector 14 positioned above a light source 15 enclosed by a light refracting unit 16. Refractor base 18, which supports the light refracting unit and the light source is positioned directly below the light reflecting unit.

A photo-control mounting unit 20 having a semi-cylindrical outer surface 23 is suitably mounted within cylindrical support 19, in turn supported by pole 12 by any suitable means (not shown). The shape of surface 23 is adapted to conform to the generally cylindrical shape of the support and the lighting pole. A prismatic unit 22 is mounted in mounting unit 20 to allow face 24 of light directing prism 28 to receive light rays through aperture 26, cut out of surface 23.

Figure 4:
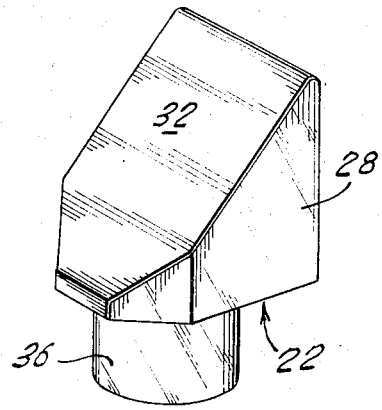
FIG. 4 is a perspective view of the prismatic unit.
Figure 3:
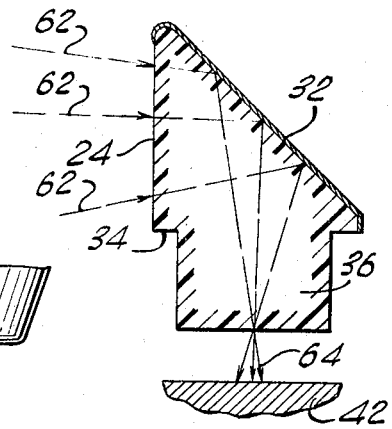
FIG. 3 is a sectional view of the prismatic element of the unit showing light rays incident thereon.

As is best understood by reference to FIGS. 3 and 4, light directing prism 28 includes light controlling surface 32, utilized to reflect internally light incident thereon in a downward direction through a light control cylinder 36, which depends downwardly from bottom surface 34 of prism 28. Light control cylinder 36 may be integrally formed with prism 28 or may be attached thereto by any suitable means.

A coating or covering of shielding material is applied to surface 32 of the prism. As this coating will prevent light from passing through it, the prism has only one surface which will act as the controlling face of the prism, and the possibility of the prism obtaining light from a source which could activate light sensitive cell 42 prematurely is avoided.

Light controlling prism 28 and light control tube 36 are preferably molded of clear acrylic plastic but may of course utilize any other suitable material which will allow the prism to perform the function described. The control tube, it should be noted, may be molded to various lengths, thereby enabling light sensitive cell 42 to be mounted at varying heights inside the housing.

Figure 2:
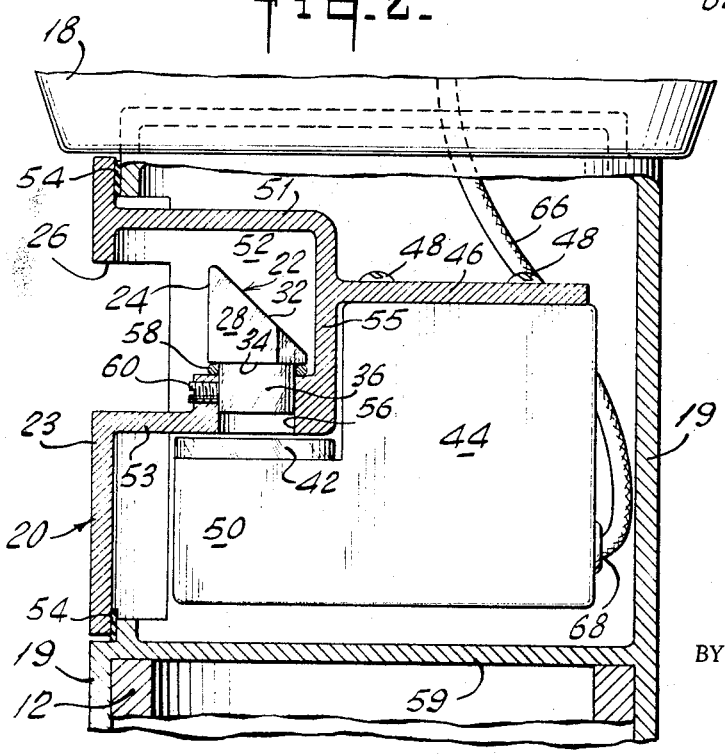
FIG. 2 is a vertical sectional view of the unit in the lighting fixture of FIG. 1.

Turning now to FIG. 2 there is shown a typical installation of an embodiment of the present invention. A photoelectric L-shaped control switch 44 is secured on mounting unit 20 to shoulder 46 by screws 48. Light sensitive cell 42 is secured to the horizontal leg 50 of the L-shaped control switch 44, directly below tube 36 of prismatic unit 22. The prismatic unit 22 is positioned within cavity 52, formed by ledges 51 and 53 and stanchion 55. Gaskets 54 are provided to help seal light sensitive cell 42 and photoelectric control switch 44 within cylindrical support 19. A mounting hole 56 provides for the insertion therein of tube 36 of prismatic unit 22. Gasket 58 is fitted about tube 36 before the prismatic unit is inserted into the mounting hole, the gasket coming to rest against bottom surface 34 of the light controlling prism. Gaskets 54 and 58 along with cylindrical support 19, including an integrally formed floor member 59, combine to provide a complete seal against the entry into the enclosure occupied by the light sensitive cell and the photoelectric control switch of any undesirable stray light, moisture, dirt or other harmful elements.

When control cylinder 36 of the prismatic unit is inserted into the mounting hole, with gasket 58 fitted about the tube, a slight downward pressure will seal the mounting hole. The set screw 60 may then be tightened while pressure is still exerted downwardly on the prismatic unit, which has been rotated to the position desired, to lock the prismatic unit securely in place.

Turning now to the operation of the light controlled luminaire, light, represented by rays 62 may enter prism 28 through face 24 and continue on until they reach light controlling surface 32. At this point, they are reflected downwardly through light control cylinder 36 to exit as rays 64 and impinge upon light sensitive cell 42. Light sensitive cell 42 is electrically connected to photoelectric control switch 44. Both the light sensitive cell and the photoelectric control switch are well known in the art, and it will not be necessary to go into a detailed description of the construction and operation of these units.

When a predetermined amount of light has impinged upon the light sensitive cell the photoelectric control switch is activated, thereby initiating the operation of the luminaire. Electrical lead 66, connected to the photoelectric control switch through aperture 68 extends upwardly to light source 15 within the luminaire, and provides the necessary electrical connection between the photoelectric switch and the luminaire to actuate the light source.

From the foregoing, it can be understood that apparatus has been provided in the presently disclosed invention which eliminates time and effort in re-orienting the photocontrol unit. With this invention it is merely necessary to loosen set screw 60 and rotate prismatic unit 22 in mounting hole 56 to reorient the angle of light reception. In addition, the light sensitive cell and the photoelectric control switch are protected from the weather and the direct rays of the sun, which would have a deleterious effect upon those units.

Furthermore, the structure of the prismatic unit provides increased control of the light rays directed to the light sensitive cell. It should be noted that the photoelectric control switch and light sensitive cell may be installed as an integral component of the light controlled luminaire within cylindrical support 19 when it is assembled at the factory by a simple and inexpensive mounting method. Thus the luminaire may be installed at its operating location relatively easily because it is all one unit. It is then a simple matter to insert or adjust the prismatic unit to accommodate the assembly to the lighting conditions of any particular location.

Thus, an easily assembled light controlled luminaire may be manufactured at a relatively low cost and installed in its operating location and adjusted and maintained there at a substantially reduced cost in time and money.

It will be understood that certain features and sub-combinations are of utility and may be employed without reference to other features and sub-combinations. It is further obvious that various changes may be made in details without departing from the spirit of the present invention. It is, therefore, to be understood that this invention is not to be limited to the specific details shown and described.

I have described what I believe to be the best embodiments of my invention. It do not wish, however, to be confined to the embodiments shown, but what I desire to cover by Letters Patent is set forth in the following claims:

1. In photoelectric luminaire apparatus, a housing having window means in a sidewall portion thereof to receive ambient light, photoelectric means located within said housing for controlling the activation and deactivation of the luminaire light source in response to the amount of light received by the light-sensitive portion of said photoelectric means, said light-sensitive portion being disposed below the level of said window means, and light-directing means comprising a prism having a light-entering side facing said window means to receive the ambient light and having a light conducting portion forming the light-exit portion of said prism for directing the received ambient light downwardly to said light-sensitive portion of said photoelectric means, said prism being rotatably adjustable about a fixed axis so that said light-entering side of said prism may be geographically oriented to a desired position.

2. A photoelectric luminaire apparatus according to claim 1, in which said prism and said light conducting portion form an integral piece of transparent material.

3. In photoelectric luminaire apparatus, a housing having window means in a sidewall portion thereof to receive ambient light, photoelectric means located within said housing for controlling the activation and de-activation of the luminaire light source in response to the amount of light received by the light-sensitive portion of said photoelectric means, said light-sensitive portion being disposed below the level of said window means, and light directing means comprising a prism having a light-entering side facing said window means to receive the ambient light and comprising a cylindrical light-conducting portion forming the light-exit portion of said prism for directing ambient light received therein to said light-sensitive portion of said photoelectric means, support means having an aperture therein, said light-conducting portion being rotatably mounted within said aperture and adjustable therein about a fixed axis so that said light-entering side of said prism may be geographically oriented to a desired position.

References Cited
UNITED STATES PATENTS

| | | | |
|---|---|---|---|
| 2,216,031 | 9/1940 | Bennett | 88—1 |
| 2,917,664 | 12/1959 | Rabinow | 250—239 X |
| 3,056,035 | 9/1962 | Bernheim | 250—239 |
| 3,085,179 | 4/1963 | Keeran | 250—239 X |

FOREIGN PATENTS

| | | |
|---|---|---|
| 785,249 | 10/1935 | France. |

RALPH G. NILSON, *Primary Examiner.*

J. D. WALL, *Assistant Examiner.*